US011226664B2

(12) United States Patent
Jyani et al.

(10) Patent No.: US 11,226,664 B2
(45) Date of Patent: Jan. 18, 2022

(54) SYSTEM AND METHOD FOR FAULT DETECTION AND PROTECTION ON VCONN SUPPLY AND CONFIGURATION CHANNEL LINE IN USB INTERFACE

(71) Applicant: SILICONCH SYSTEMS PVT LTD, Karnataka (IN)

(72) Inventors: Ashok Kumar Jyani, Karnataka (IN); Satish Anand Verkila, Karnataka (IN); Shubham Paliwal, Uttar Pradesh (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 62 days.

(21) Appl. No.: 16/908,242

(22) Filed: Jun. 22, 2020

(65) Prior Publication Data

US 2021/0303048 A1    Sep. 30, 2021

(30) Foreign Application Priority Data

Mar. 31, 2020 (IN) .............................. 202041014323

(51) Int. Cl.
   *G06F 1/26* (2006.01)
   *G06F 13/38* (2006.01)
   *G06F 1/3215* (2019.01)

(52) U.S. Cl.
   CPC ............ *G06F 1/266* (2013.01); *G06F 1/3215* (2013.01); *G06F 13/382* (2013.01); *G06F 2213/0042* (2013.01)

(58) Field of Classification Search
   CPC ...... G06F 1/266; G06F 1/3215; G06F 13/382; G06F 2213/0042
   See application file for complete search history.

(56) References Cited

U.S. PATENT DOCUMENTS 11,100,034 B1 *   8/2021   Vispute ............... G06F 13/4282
2015/0015300 A1 * 1/2015   Simonson .......... H03K 17/0822
                                                           324/762.09
(Continued)

OTHER PUBLICATIONS

Universal Serial Bus Type-C Cable and Connector Specification Release 2.0, USB 3.0 Promoter Group, Aug. 2019 (373 pages).
(Continued)

*Primary Examiner* — Nimesh G Patel
(74) *Attorney, Agent, or Firm* — Procopio, Cory, Hargreaves & Savitch LLP

(57) ABSTRACT

Systems and methods for providing VCONN to configuration channel line in USB-interface, involving a sense switch and a VCONN switch coupled with the VCONN supply and a gate control unit; an over current protection (OCP) reference current unit configured to provide a predetermined current through the sense branch; a preamplifier configured to amplify a differential voltage between source terminal voltages of the sense switch and the VCONN switch; an Over Current detection comparator configured to generate an Over Current fault signal when the source terminal voltage at the VCONN switch is lower than the source terminal voltage at the sense switch; and a control unit configured to: activate, upon receipt of the generated Over Current fault signal, the gate control unit, wherein the gate control unit, upon activation, is configured to disable the sense switch and the VCONN switch respectively to protect the VCONN and CC_P from over current.

19 Claims, 7 Drawing Sheets

(56) References Cited

U.S. PATENT DOCUMENTS

| | | | |
|---|---|---|---|
| 2018/0248356 A1* | 8/2018 | Klein | G06F 13/4282 |
| 2018/0358831 A1* | 12/2018 | Weissinger | H02J 7/00 |
| 2019/0319447 A1* | 10/2019 | Mukhopadhyay | G06F 13/4295 |
| 2020/0303916 A1* | 9/2020 | Ontiveros | G06F 13/385 |

OTHER PUBLICATIONS

Universal Serial Bus Power Delivery Specification, Revision 3.0, Version 2.0, Aug. 29, 2019 (657 pages).

* cited by examiner

SYSTEM AND METHOD FOR FAULT DETECTION AND PROTECTION ON VCONN SUPPLY AND CONFIGURATION CHANNEL LINE IN USB INTERFACE

CROSS REFERENCE TO RELATED APPLICATIONS

This Paris Convention Patent Application claims benefit under 35 U.S.C. § 119 and claims priority to Indian Patent Application No. IN 202041014323, filed on Mar. 31, 2020, titled "SYSTEM AND METHOD FOR FAULT DETECTION AND PROTECTION ON VCONN SUPPLY AND CONFIGURATION CHANNEL LINE IN USB INTERFACE", the content of which is incorporated herein in its entirety by reference for all purposes.

TECHNICAL FIELD

The present disclosure relates to power supply systems. More particularly, the present disclosure relates to a system and method for supplying VCONN (connection power) to configuration channel (CC1/CC2) lines in USB interfaces using USB cables.

BACKGROUND

Background description includes information that can be useful in understanding the present invention. It is not an admission that any of the information provided herein is prior art or relevant to the presently claimed invention, or that any publication specifically or implicitly referenced is prior art.

A plurality of USB (Universal Serial Bus) connectors and related standards have been developed. Recently, a USB Type-C standard has been developed including multiple requirements for USB Type-C connectors and the operation of devices implementing USB Type-C connections. Once two USB Type-C devices have completed connection negotiations and are connected through a USB Type-C connection, one device will operate as a DFP (downward facing port) device while the other device will operate as a UFP (upward facing port) device. It is also noted that these roles can be swapped based upon additional communications between the two devices. The USB Type-C standard is described, for example, in the USB Type-C Cable and Connector Specification (v1.1) released in 2015.

The USB Type-C standard can provide a variety of potential physical connection types including a Type-C plug and a Type-C receptacle for enabling physical connection. The Type-C plug is symmetrical and can be inserted into the Type-C receptacle in two orientations. As such, the USB Type-C standard includes an orientation detection procedure so that a device having a Type-C receptacle can determine the orientation for an inserted Type-C plug from another device. While there are a variety of connections in the USB Type-C connection, two of these connections are the VCONN (connection power) connection and the CC (configuration channel) connection. The CC connection is used for cable orientation detection as well as configuration and management of connections across a USB Type-C cable. The VCONN connection can be used to power active or electronically marked cables. In some applications, such as with VCONN powered accessories, the power from the VCONN connection provides only power source. In other applications, such as with cell phones, the power from the VCONN connection is used to run low-power features.

However, there are few drawbacks while providing power from VCONN to CC pin, and drawbacks are over current, over voltage, reverse current and short circuit. Therefore, there is a need to protect VCONN and CC pins from above-mentioned drawbacks.

Further, there are traditional protection devices, such as circuit breakers, are described with trip curves (e.g., usually semi-logarithmic representations of current versus time (log)). In the case of a thermo-magnetic circuit breaker, both a thermal element (e.g., responding to relatively lower currents analogous to $I^2R$ heating of the power circuit wiring) and an instantaneous magnetic element (e.g., typically responding to a suitable factor above rated current, such as, for example, about 200 A for a 20 A current rating) are combined. Fuses respond analogous to heating of wiring as fuses are widely used as overcurrent protection devices to prevent costly damage to electrical circuits. Fuse terminals typically form an electrical connection between an electrical power source and an electrical component, or a combination of components arranged in an electrical circuit. One or more fusible links or elements, or a fuse element assembly, is connected between the fuse terminals, so that when electrical current through the fuse exceeds a predetermined limit, the fusible elements melt and opens one or more circuits through the fuse to prevent electrical component damage.

Fuses are employed not only to provide fused electrical connections but also for connection and disconnection, or switching, purposes to complete or break an electrical connection or connections. As such, an electrical circuit is completed or broken through conductive portions of the fuse, thereby energizing or de-energizing the associated circuitry. Typically, the fuse is housed in a fuse holder having terminals that are electrically coupled to desired circuitry. When conductive portions of the fuse, such as fuse blades, terminals, or ferrules, are engaged to the fuse holder terminals, an electrical circuit is completed through the fuse, and when conductive portions of the fuse are disengaged from the fuse holder terminals, the electrical circuit through the fuse is broken. Therefore, by inserting and removing the fuse to and from the fuse holder terminals, a fused disconnect switch is realized.

Further, in USB Type-C connection interfaces, various protection schemes have been implemented, by using feedback networks, to protect connections from over current, over voltage, short current, reverse current and any other limitations. By using a feedback network (with help of operational amplifiers or any other existing circuitry), there might be problems associated with stability, looping, and so on. The feedback network may make the power supply system unreliable, frail, and complex; and the system might become less sensitive in detecting and clearing faults. Most of faults associated with over current, over voltage, short current, reverse current and any other limitations may not be detected accurately, and this may lead to damage of electrically connected components in the power supply system. In order to be applicable for various threshold over current limitations, existing solutions may become complex to be implemented practically.

Therefore, there is a need in the art to provide a robust system and method for providing VCONN (connection power) to one or more configuration channels (CC1, CC2 etc.) line through a universal serial bus (USB) interface with enhanced and reliable protection against over current limitations.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

SUMMARY

Some of the objects of the present disclosure, which at least one embodiment herein satisfies are as listed herein below.

It is an object of the present disclosure to provide a system and method for providing VCONN (connection power) to at least one configuration channel (CC) pin in a universal serial bus (USB) interface.

It is an object of the present disclosure to provide a robust system and method for providing VCONN (connection power) to configuration channel (CC) pin in a USB interface.

It is another object of the present disclosure to provide a simple and cost-effective system and method for providing VCONN (connection power) to configuration channel (CC) pin in a USB interface.

It is another object of the present disclosure to provide a reliable and efficient system and method for providing VCONN (connection power) to configuration channel (CC) pin in a USB interface with enhanced protection from over current, short circuit, over voltage and reverse current limitations at CC pin and VCONN pin.

The present disclosure relates to power supply systems. More particularly, the present disclosure relates to a system and method for supplying VCONN (connection power) to configuration channel (CC) pins in USB interfaces using USB cables.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

In an aspect, the present disclosure provides a system for providing VCONN (connection power) to any one configuration channel (CC) pin in a universal serial bus (USB) interface with protections on both VCONN and configuration channel independently. The system includes: a sense switch of a first predefined size operatively coupled with the VCONN supply and through a sense branch; a VCONN switch of a second predefined size operatively coupled with the VCONN supply and the CC pin through a VCONN branch such that current through the VCONN switch remains within a predefined current limit; a gate control unit operatively coupled with the sense switch and the VCONN switch and comprising a charge pump and a soft start, wherein the gate control unit is configured to provide a gate voltage to the sense switch and the VCONN switch, said gate voltage being of a same value at both of the sense switch and the VCONN switch; an over current protection (OCP) reference current unit operatively coupled with the sense switch through the sense branch, wherein the OCP reference current unit is configured to provide a predetermined current through the sense branch, which is a function of maximum allowable current through the VCONN switch and is lower than the maximum allowable current through the VCONN switch; a preamplifier with two input pins such that the sense switch and the VCONN switch are both operatively coupled with both the input pins, wherein the preamplifier is configured to amplify a differential voltage between source terminal voltages of the sense switch and the VCONN switch; an Over Current detection comparator operatively coupled to the pre-amplifier, the Over Current detection comparator is configured to identify difference in the source terminal voltages at the sense switch and the VCONN switch, and generate an Over Current fault signal when the source terminal voltage at the VCONN switch is lower than the source terminal voltage at the sense switch, wherein the Over Current fault signal indicates current through the VCONN switch is greater than the predetermined current; and a control unit operatively coupled to the Over Current comparator and the gate control unit, the control unit comprising one or more processors and a memory, the memory storing instructions executable by the one or more processors to: activate, upon receipt of the generated Over Current fault signal, the gate control unit, wherein the gate control unit, upon activation, is configured to disable the sense switch and the VCONN switch respectively to protect the VCONN and CC_P from over current.

In an embodiment, the preamplifier can be a rail-to-rail fully differential cascode amplifier.

In another embodiment, the first branch can be a sense branch and the second branch is a VCONN branch.

In another embodiment, the sense switch can be an N-type metal-oxide-semiconductor (NMOS) of size N1 and the VCONN switch can be an NMOS of size N2, and wherein N1<N2 with N1 and N2 being any value above 1.

In another embodiment, the sense switch can be a P-type metal-oxide-semiconductor (PMOS) of size N1 and the VCONN switch can be a PMOS of size N2, and wherein N1<N2 with N1 and N2 being any value above 1.

In another embodiment, the system includes a programmable sense current source operatively coupled to the control unit and the Over Current reference current unit, wherein the control unit is configured to control the programmable sense current source to modify current through the sense branch to modify corresponding source terminal voltage at the sense switch to modify over current limit.

In another embodiment, the control unit is configured to, upon activation of the fault, disable the charge pump to switch off the sense switch, the VCONN switch and trickle current switch.

In another embodiment, the system includes: a trickle current switch operatively coupled to the VCONN and the CC pin to detect short-circuit fault using a short-circuit detection comparator, wherein, before activating the gate control unit, the control unit is configured to: switch on the trickle current switch such that a trickle current flows, through the trickle current switch to the CC pin; compare, using the short-circuit detection comparator, voltage, corresponding to the trickle current, at the CC pin with a predetermined voltage to be at the CC pin (V-ref-CC-low), wherein, a second fault signal (cc_low_fault) is generated when the voltage corresponding to the trickle current is less than the V-ref-CC-low.

In another embodiment, in the event that the second fault signal (cc_low_fault) is not generated, the control unit is configured to activate the gate control unit, and configured to: switch on the trickle current switch such that a trickle current flows, through the trickle current switch to the CC pin; compare, using the short-circuit detection comparator, voltage, corresponding to the trickle current, at the CC pin with a predetermined voltage to be at the CC pin (V-ref-CC-low), wherein, a second fault signal (cc_low_fault) is generated when the voltage corresponding to the trickle current is less than the V-ref-CC-low; and disable, upon generation of the second fault signal (cc_low_fault), the charge pump to switch off the sense switch, the VCONN switch and the trickle current switch to protect the VCONN and CC pin from short circuit.

In another embodiment, the control unit can be configured to determine a CC short circuit fault when CC pin is below the V-ref-CC-low threshold, after which the trickle current switch is disabled by the digital block, and wherein the digital block enables the trickle current switch after a pre-defined time window.

In another embodiment, after VCONN is enabled, the short-circuit detection fault comparator is disabled, and wherein any or a combination of short-circuit and over-current conditions on the CC/VCONN line are determined by the over-current comparator.

In another embodiment, the system includes a CC Over-Voltage detection comparator, the CC Over Voltage detection comparator is configured to compare voltage at the CC pin with a predetermined voltage to be at the CC to generate a CC Over Voltage fault signal when the voltage at the CC pin is greater than the predetermined voltage to be at the CC, wherein the control unit is configured to disable, upon generation of the CC Over Voltage fault signal, the CC protection switch as well as the charge pump to disconnect the VCONN supply and to protect the VCONN and CC pin from over voltage at the CC pin.

In another embodiment, the system includes a reverse current detection comparator configured to compare voltage at the CC pin with voltage at the VCONN pin, and generate a reverse current fault signal when the CC pin voltage is greater than the VCONN voltage, and wherein the control unit is configured to disable, upon generation of the reverse current fault signal, the CC protection switch as well as the charge pump to disconnect the VCONN supply and to protect the VCONN and CC pin from reverse current flowing from the CC pin to the VCONN pin.

In another embodiment, the system includes a VCONN over voltage detection comparator configured to compare voltage at the VCONN pin with the predetermined voltage to be at the VCONN to generate a VCONN over voltage fault signal, and wherein the control unit is configured to disable, upon generation of the VCONN over voltage fault signal, the charge pump to disconnect the VCONN supply and to protect the VCONN and the CC pin from over voltage at the VCONN pin.

In another embodiment, the system includes a fault clearing digital circuit operatively coupled to the control unit, and wherein the control unit is configured to: reset, using the fault clearing digital circuit, a fault signal that can be selected from any or a combination of the Over Current fault signal, short-circuit fault signal, CC Over voltage fault signal, reverse current fault signal and VCONN Over voltage fault signal; and enable the VCONN supply once the fault signal is cleared.

In another embodiment, the fault clearing digital circuit, upon receiving generated fault signal pertaining to an over-voltage on configuration channel pin, is configured to: when interrupt is raised to the fault clearing digital circuit, disable the CC protection switch, and wherein, when the fault condition abates as detected by the CC over-voltage comparator, the CC protection switch is enabled.

In another embodiment, the fault clearing digital circuit, upon receiving generated fault signal pertaining to a reverse current fault on configuration channel pin, is configured to: when interrupt is raised to the fault clearing digital circuit, disable the VCONN switch, the CC protection switch and the trickle current switch, and wherein, when fault condition abates as detected by the reverse current comparator, the VCONN switch, the CC protection switch and the trickle current switch are enabled.

In another embodiment, the fault clearing digital circuit, upon receiving generated fault signal pertaining to an over-current fault on configuration channel pin, is configured to: when interrupt is raised to the fault clearing digital circuit, disable the VCONN supply for a pre-defined period of time; the VCONN supply is enabled after the predefined period of time, and wherein, in the presence of the fault condition, the VCONN supply remains disabled, and wherein when the fault condition abates, the VCONN supply is enabled, else the VCONN switch remains disabled.

In another embodiment, the USB interface is an USB Type-C interface.

In an aspect, the present disclosure provides a method for providing VCONN (connection power) any one configuration channel (CC) pin in a universal serial bus (USB) interface with protections on both VCONN and configuration channel independently. The method includes the steps of: providing, using a gate control unit operatively coupled to a sense switch and a VCONN switch, gate voltage to the sense switch and the VCONN switch, wherein the gate control unit comprises a charge pump and a soft start; providing, by an over current protection (OCP) reference current unit operatively coupled to the sense switch through a sense branch, a predetermined current through the sense branch, which is a function of maximum allowable current through the VCONN switch and is lower than the maximum allowable current through the VCONN switch; amplifying, using a preamplifier with two input pins such that the sense switch and the VCONN switch are operatively coupled to the two input pins, a differential voltage between source terminals of the sense switch and the VCONN switch, said sense switch and said VCONN switch being operatively coupled with both the input pins; identifying, using an over current detection comparator operatively coupled to the pre-amplifier, difference in the source terminal voltages at the sense switch and the VCONN switch; generating, using the over current detection comparator, a first fault signal (ocp_fault) signal when the source terminal voltage at the VCONN switch is less than the source terminal voltage at the sense switch, wherein the first fault signal (ocp_fault) signal indicates current through the VCONN switch is greater than the predetermined current; and activating, by a control unit operatively coupled to the over current detection comparator, upon receipt of the generated first fault signal (ocp_fault) signal, the gate control unit, wherein the gate control unit, upon activation, is configured to disable the sense switch and the VCONN switch respectively to protect the VCONN and CC pin from over current.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The diagrams are for illustration only, which thus is not a limitation of the present disclosure, and wherein.

DETAILED DESCRIPTION

Figure 1:
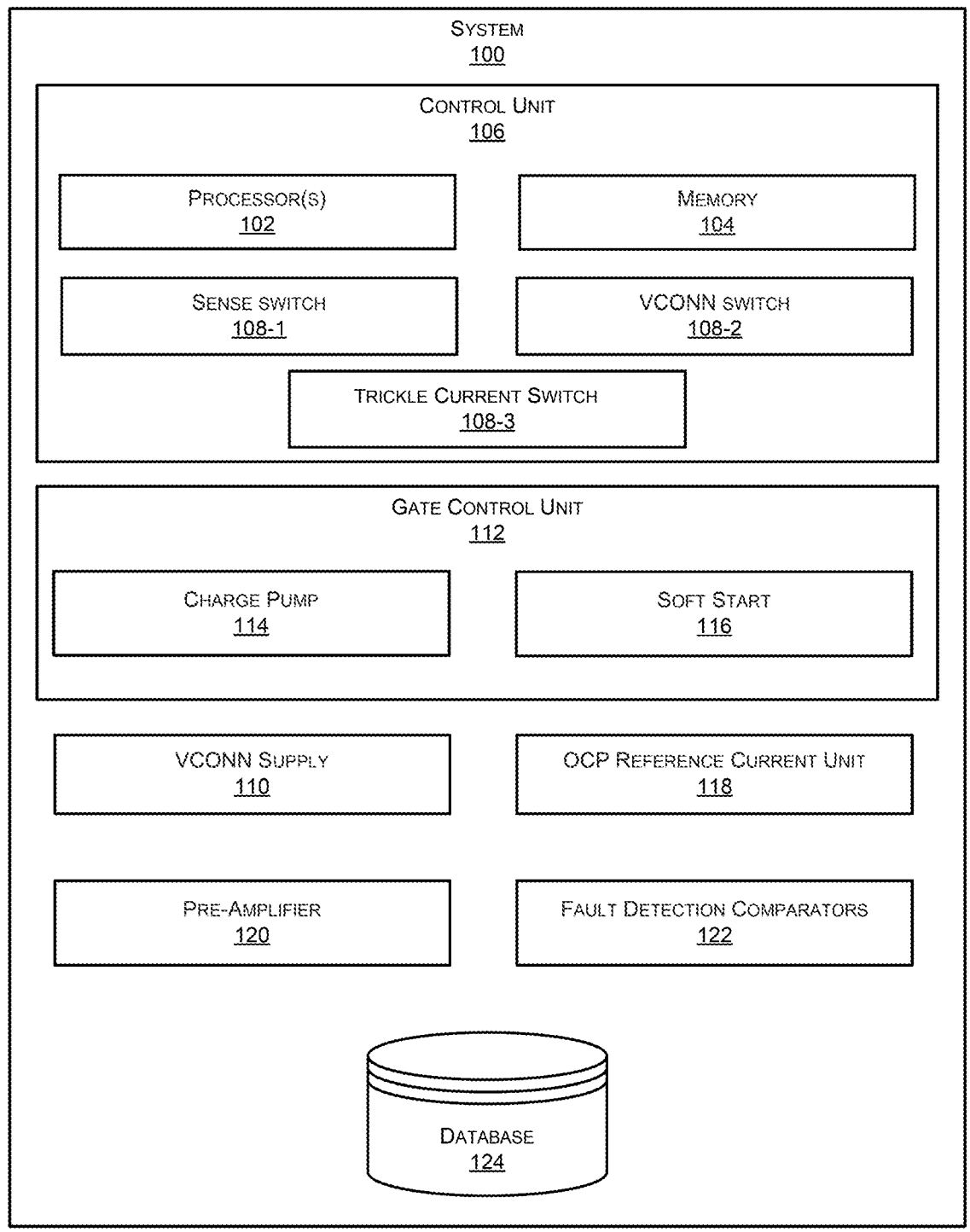
FIG. 1 illustrates an exemplary module diagram representation of a system for providing VCONN (connection power) to at least one configuration channel (CC) pin in a universal serial bus (USB) interface, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to protected and safety power supply systems. More particularly, the present disclosure relates to a system and method for supplying VCONN (connection power) to configuration channel (CC) pins in USB interfaces using USB cables with enhanced protection from over current faults, reverse current faults, over voltage faults, short circuit faults.

In an aspect, the present disclosure provides a system for providing VCONN (connection power) to any one configuration channel (CC) pin in a universal serial bus (USB) interface with protections on both VCONN and configuration channel independently. The system includes: a sense switch of a first predefined size operatively coupled with the VCONN supply and through a sense branch; a VCONN switch of a second predefined size operatively coupled with the VCONN supply and the CC pin through a VCONN branch such that current through the VCONN switch remains within a predefined current limit; a gate control unit operatively coupled with the sense switch and the VCONN switch and comprising a charge pump and a soft start, wherein the gate control unit is configured to provide a gate voltage to the sense switch and the VCONN switch, said gate voltage being of a same value at both of the sense switch and the VCONN switch; an over current protection (OCP) reference current unit operatively coupled with the sense switch through the sense branch, wherein the OCP reference current unit is configured to provide a predetermined current through the sense branch, which is a function of maximum allowable current through the VCONN switch and is lower than the maximum allowable current through the VCONN switch; a preamplifier with two input pins such that the sense switch and the VCONN switch are both operatively coupled with both the input pins, wherein the preamplifier is configured to amplify a differential voltage between source terminal voltages of the sense switch and the VCONN switch; an Over Current detection comparator operatively coupled to the pre-amplifier, the Over Current detection comparator is configured to identify difference in the source terminal voltages at the sense switch and the VCONN switch, and generate an Over Current fault signal when the source terminal voltage at the VCONN switch is lower than the source terminal voltage at the sense switch, wherein the Over Current fault signal indicates current through the VCONN switch is greater than the predetermined current; and a control unit operatively coupled to the Over Current comparator and the gate control unit, the control unit comprising one or more processors and a memory, the memory storing instructions executable by the one or more processors to: activate, upon receipt of the generated Over Current fault signal, the gate control unit, wherein the gate control unit, upon activation, is configured to disable the sense switch and the VCONN switch respectively to protect the VCONN and CC_P from over current.

In an embodiment, the preamplifier can be a rail-to-rail fully differential cascode amplifier.

In another embodiment, the first branch can be a sense branch and the second branch is a VCONN branch.

In another embodiment, the sense switch can be an N-type metal-oxide-semiconductor (NMOS) of size N1 and the VCONN switch can be an NMOS of size N2, and wherein N1<N2 with N1 and N2 being any value above 1.

In another embodiment, the sense switch can be a P-type metal-oxide-semiconductor (PMOS) of size N1 and the VCONN switch can be a PMOS of size N2, and wherein N1<N2 with N1 and N2 being any value above 1.

In another embodiment, the system includes a programmable sense current source operatively coupled to the control unit and the Over Current reference current unit, wherein the control unit is configured to control the programmable sense current source to modify current through the sense branch to modify corresponding source terminal voltage at the sense switch to modify over current limit.

In another embodiment, the control unit is configured to, upon activation of the fault, disable the charge pump to switch off the sense switch, the VCONN switch and trickle current switch.

In another embodiment, the system includes: a trickle current switch operatively coupled to the VCONN and the CC pin to detect short-circuit fault using a short-circuit detection comparator, wherein, before activating the gate control unit, the control unit is configured to: switch on the trickle current switch such that a trickle current flows, through the trickle current switch to the CC pin; compare, using the short-circuit detection comparator, voltage, corresponding to the trickle current, at the CC pin with a predetermined voltage to be at the CC pin (V-ref-CC-low), wherein, a second fault signal (cc_low_fault) is generated when the voltage corresponding to the trickle current is less than the V-ref-CC-low, a second fault signal (cc_low_fault).

In another embodiment, in the event that the second fault signal (cc_low_fault) is not generated, the control unit is configured to activate the gate control unit, and configured to: switch on the trickle current switch such that a trickle current flows, through the trickle current switch to the CC pin; compare, using the short-circuit detection comparator, voltage, corresponding to the trickle current, at the CC pin with a predetermined voltage to be at the CC pin (V-ref-CC-low), wherein, a second fault signal (cc_low_fault) is generated when the voltage corresponding to the trickle current is less than the V-ref-CC-low; and disable, upon generation of the second fault signal (cc_low_fault), the charge pump to switch off the sense switch, the VCONN switch and the trickle current switch to protect the VCONN and CC pin from short circuit.

In another embodiment, the control unit can be configured to determine a CC short circuit fault when CC pin is below the V-ref-CC-low threshold, after which the trickle current switch is disabled by the digital block, and wherein the digital block enables the trickle current switch after a pre-defined time window.

In another embodiment, after VCONN is enabled, the short-circuit detection fault comparator is disabled, and wherein any or a combination of short-circuit and over-current conditions on the CC/VCONN line are determined by the over-current comparator.

In another embodiment, the system includes a CC Over-Voltage detection comparator, the CC Over Voltage detection comparator is configured to compare voltage at the CC pin with a predetermined voltage to be at the CC to generate a CC Over Voltage fault signal when the voltage at the CC pin is greater than the predetermined voltage to be at the CC, wherein the control unit is configured to disable, upon generation of the CC Over Voltage fault signal, the CC protection switch as well as the charge pump to disconnect the VCONN supply and to protect the VCONN and CC pin from over voltage at the CC pin.

In another embodiment, the system includes a reverse current detection comparator configured to compare voltage at the CC pin with voltage at the VCONN pin, and generate a reverse current fault signal when the CC pin voltage is greater than the VCONN voltage, and wherein the control unit is configured to disable, upon generation of the reverse current fault signal, the CC protection switch as well as the charge pump to disconnect the VCONN supply and to protect the VCONN and CC pin from reverse current flowing from the CC pin to the VCONN pin.

In another embodiment, the system includes a VCONN over voltage detection comparator configured to compare voltage at the VCONN pin with the predetermined voltage to be at the VCONN to generate a VCONN over voltage fault signal, and wherein the control unit is configured to disable, upon generation of the VCONN over voltage fault signal, the charge pump to disconnect the VCONN supply and to protect the VCONN and the CC pin from over voltage at the VCONN pin.

In another embodiment, the system includes a fault clearing digital circuit operatively coupled to the control unit, and wherein the control unit is configured to: reset, using the fault clearing digital circuit, a fault signal that can be selected from any or a combination of the Over Current fault signal, short-circuit fault signal, CC Over voltage fault signal, reverse current fault signal and VCONN Over voltage fault signal; and enable the VCONN supply once the fault signal is cleared.

In another embodiment, the fault clearing digital circuit, upon receiving generated fault signal pertaining to an over-voltage on configuration channel pin, is configured to: when interrupt is raised to the fault clearing digital circuit, disable the CC protection switch, and wherein, when the fault condition abates as detected by the CC over-voltage comparator, the CC protection switch is enabled.

In another embodiment, the fault clearing digital circuit, upon receiving generated fault signal pertaining to a reverse current fault on configuration channel pin, is configured to: when interrupt is raised to the fault clearing digital circuit, disable the VCONN switch, the CC protection switch and the trickle current switch, and wherein, when fault condition abates as detected by the reverse current comparator, the VCONN switch, the CC protection switch and the trickle current switch are enabled.

In another embodiment, the fault clearing digital circuit, upon receiving generated fault signal pertaining to an over-current fault on configuration channel pin, is configured to: when interrupt is raised to the fault clearing digital circuit, disable the VCONN supply for a pre-defined period of time; the VCONN supply is enabled after the predefined period of time, and wherein, in the presence of the fault condition, the VCONN supply remains disabled, and wherein when the fault condition abates, the VCONN supply is enabled, else the VCONN switch remains disabled.

In another embodiment, the USB interface is an USB Type-C interface.

In an aspect, the present disclosure provides a method for providing VCONN (connection power) any one configuration channel (CC) pin in a universal serial bus (USB) interface with protections on both VCONN and configuration channel independently. The method includes the steps of: providing, using a gate control unit operatively coupled to a sense switch and a VCONN switch, gate voltage to the sense switch and the VCONN switch, wherein the gate control unit comprises a charge pump and a soft start; providing, by an over current protection (OCP) reference current unit operatively coupled to the sense switch through a sense branch, a predetermined current through the sense branch, which is a function of maximum allowable current through the VCONN switch and is lower than the maximum allowable current through the VCONN switch; amplifying, using a preamplifier with two input pins such that the sense switch and the VCONN switch are operatively coupled to the two input pins, a differential voltage between source terminals of the sense switch and the VCONN switch, said sense switch and said VCONN switch being operatively coupled with both the input pins; identifying, using an over current detection comparator operatively coupled to the pre-amplifier, difference in the source terminal voltages at the sense switch and the VCONN switch; generating, using the over current detection comparator, a first fault signal (ocp_fault) signal when the source terminal voltage at the VCONN switch is less than the source terminal voltage at the sense switch, wherein the first fault signal (ocp_fault) signal indicates current through the VCONN switch is greater than the predetermined current; and activating, by a control unit operatively coupled to the over current detection comparator, upon receipt of the generated first fault signal (ocp_fault) signal, the gate control unit, wherein the gate control unit, upon activation, is configured to disable the sense switch and the VCONN switch respectively to protect the VCONN and CC pin from over current.

FIG. 1 illustrates an exemplary module diagram representation of a system for providing VCONN (connection power) to at least one configuration channel (CC) pin in a universal serial bus (USB) interface, in accordance with an embodiment of the present disclosure.

According to an embodiment, the system 100 can include one or more processor(s) 102. The one or more processor(s) 102 can be implemented as one or more microprocessors, microcomputers, microcontrollers, digital signal processors, central processing units, logic circuitries, and/or any devices that manipulate data based on operational instructions. Among other capabilities, the one or more processor(s) 102 are configured to fetch and execute computer-readable instructions stored in a memory 104 of the system 100. The memory 104 can store one or more computer-readable instructions or routines, which can be fetched and executed to create or share the data units over a network service. The memory 104 can include any non-transitory storage device including, for example, volatile memory such as RAM, or non-volatile memory such as EPROM, flash memory, and the like.

Various components/units of the proposed system 100 can be implemented as a combination of hardware and programming (for example, programmable instructions) to implement their one or more functionalities as elaborated further themselves or using processors 102. In examples described herein, such combinations of hardware and programming can be implemented in several different ways. For example, the programming for the units can be processor executable instructions stored on a non-transitory machine-readable storage medium and the hardware for units can include a processing resource (for example, one or more processors), to execute such instructions. In the present examples, the machine-readable storage medium can store instructions that, when executed by the processing resource, implements the various units. In such examples, the system 100 can include the machine-readable storage medium storing the instructions and the processing resource to execute the instructions, or the machine-readable storage medium can be separate but accessible to the system 100 and the processing resource. In other examples, the units can be implemented by electronic circuitry. A database 124 can include data that is either stored or generated as a result of functionalities implemented by any of the other components/units of the proposed system 100.

In an embodiment, the system 100 for providing VCONN (connection power) 110 to any of configuration channel pins (CC1, CC2 etc.) in the USB interface is disclosed.

In an embodiment, the system 100 can include a sense switch (sense switch M1) 108-1 with a first predefined size (N1) that can be operatively coupled to the VCONN 110 through a first branch and a VCONN switch (VCONN switch M2) 108-2 with a second predefined size (N2) that can be operatively coupled, through a second branch, to the VCONN 110 and the CC pin, wherein the VCONN switch is configured to provide power supply from the VCONN 110 to the CC pin such that the current through it will not exceed a predefined current threshold limit.

In an embodiment, the system 100 can include a gate control unit 112 that can be operatively coupled to the sense switch 108-1 and the VCONN switch 108-2 and can include a charge pump 114 and a soft start 116. The gate control unit can be configured to provide gate voltage to the sense switch 108-1 and the VCONN switch 108-2.

In an embodiment, the system 100 can include an over current protection (OCP) reference current unit 118 that can be operatively coupled to the sense switch 108-1 through the first branch. The OCP reference current unit 118 can be configured to provide a predetermined current through the first branch. The predetermined current can be a scaled down version of maximum allowable current through the VCONN switch, which can be defined by (overcurrent limit×N1/N2).

In an embodiment, the system 100 can include: a pre amplifier 120 with two input pins such that the sense switch 108-1 and the VCONN switch 108-2 can be operatively coupled to the two input pins as differential input, respectively, of the pre-amplifier 120; and a fault detection comparator 122 that can be operatively coupled to differential output of pre-amplifier 120. The pre-amplifier 120 can be configured to amplify the difference of source terminal voltages at the sense switch 108-1 and the VCONN switch 108-2 respectively. In an exemplary embodiment of the present disclosure, the fault detection comparator 122 can be of types—over-current detection comparator; short-circuit detection comparator; CC over-voltage detection comparator; and reverse current detection comparator.

In an embodiment, the over current detection comparator can be configured to identify difference in the source terminal voltage (sense_v) at the sense switch 108-1 and the source terminal voltage (cc_v) at the VCONN switch 108-2, and generate a first (an OCP) fault signal when the source terminal voltage at the VCONN switch 108-2 is less than the source terminal voltage at the sense switch 108-1, wherein the first (OCP) fault signal can indicate current through the VCONN switch can be greater than the predetermined current.

In an embodiment, the system 100 can include a control unit 106 that can be operatively coupled to the over current detection comparator and the gate control unit 112. The control unit 106 can include one or more processors 102 and memory 104. The memory 104 can store instructions executable by the one or more processors 102 to activate, upon receipt of the generated first (OCP) fault signal, the gate control unit 112, wherein the gate control unit 112, upon activation, can be configured to disable the sense switch 108-1 and the VCONN switch 108-2 respectively to protect the VCONN 110 and CC pin from over current limitations.

In an embodiment, the preamplifier 120 can be a rail-to-rail fully differential cascode amplifier. The pre-amplifier 120 can be insensitive to characteristics and particular operation (strong, moderate, and weak inversion) regions of input transistor pair of the pre-amplifier 120 and does not rely on mismatches between p-channel and n-channel devices implemented in pre-amplifier 120.

In an embodiment, the first branch can be a sense branch and the second branch can be a VCONN branch, wherein the sense switch 108-1 can be an N-type metal-oxide-semiconductor (NMOS) of size N1 and the VCONN switch 108-2 can be an NMOS of size N2. Here, N1<N2 in order to reduce area and power utilisation.

In an embodiment, the system 100 can include a programmable sense current source that can be operatively coupled to the control unit 106 and the OCP reference current unit 118, wherein the control unit 106 can be configured to control the programmable sense current source to modify current through the sense branch to modify corresponding source terminal voltage at the sense switch 108-1 to modify the over current limit.

In an embodiment, the control unit 106 can be configured to, upon activation of the gate control unit 112, disable the charge pump 114 to switch off the sense switch 108-1 and the VCONN switch 108-2.

In an embodiment, the system 100 can include a trickle current switch (M3) 108-3 that can be operatively coupled to the VCONN 110 and the CC_p via a third branch (trickle current source or trickle current branch); and a short circuit detection comparator. wherein, before activating the gate control unit, the control unit is configured to: switch on the trickle current switch (M3) 108-3 such that a trickle current flows, through the trickle current switch to the CC pin; and compare, using the short-circuit detection comparator, voltage, corresponding to the trickle current, at the CC pin with a predetermined voltage to be at the CC pin (V-ref-CC-low), wherein, a second fault signal (cc_low_fault) is generated when the voltage corresponding to the trickle current is less than the V-ref-CC-low.

In another embodiment, in the event the cc_low_fault signal is not generated, the control unit 106 is activated, and trickle current switch M3 is switched on so that a trickle current flows through the switch M3 to the CC pin. The control unit 106 is then configured to: compare, using the short circuit detection comparator, voltage corresponding to the trickle current, at the CC pin with a predetermined voltage (V-ref-CC-low) to generate a second fault signal (cc_low_fault) when the voltage corresponding to the trickle current is less than the V-ref-CC-low; and disable, upon generation of the cc_low_fault signal, the charge pump 114 to switch off the sense switch and the VCONN switch and the trickle current switch to protect the VCONN and CC pin from short circuit.

In an embodiment, the system 100 can include a VCONN over voltage comparator (FIG. 3) that can be configured to compare voltage at the VCONN 110 with a predetermined voltage to be at the VCONN 110 to generate a VCONN over voltage fault signal (VCONN_OVP_fault) when the voltage at the VCONN 110 is greater than the predetermined voltage to be at the VCONN 110, wherein the control unit 106 can be configured to disable, upon generation of VCONN_OVP_fault signal, the charge pump 114 to disconnect the VCONN supply 110 and to protect the VCONN 110 and CC pin from over voltage at the VCONN 110.

In an embodiment, the system 100 can include a CC over voltage detection comparator (FIG. 3) that can be configured to compare voltage at the CC pin with the predetermined voltage to be at the CC 110 to generate a CC over voltage fault signal (cc_ovp_fault), wherein the control unit 106 can be configured to disable, upon generation of cc_ovp_fault signal, the CC protection switch as well as the charge pump 114 to disconnect the VCONN supply 110 and to protect the VCONN 110 and the CC pin from over voltage at the CC pin.

In an embodiment, the system 100 can include a reverse current detection comparator that can be configured to compare voltage at the CC pin with voltage at the VCONN 110, and generate a reverse current fault signal (reverse_current_fault) when the CC pin voltage is greater than the VCONN voltage 110, wherein the control unit 106 can be configured to disable, upon generation of reverse_current_fault signal, the CC protection switch as well as the charge pump 114 to disconnect the VCONN supply 110 and to protect the VCONN 110 and CC pin from reverse current from the CC pin to the VCONN pin 110.

In an embodiment, the system 100 can include a fault clearing digital circuit that can be operatively coupled to the control unit 106. The control unit 106 can be configured to: reset, using the fault clearing digital circuit, a fault signal that can be selected from any or a combination of the first fault signal (ocp_fault) signal, second fault signal (cc_low_fault), third fault signal (cc_ovp_fault), fourth fault signal (reverse_current_fault) and fifth fault signal (VCONN_ovp_fault); and enable the VCONN supply once the fault signal is cleared.

In an embodiment, the USB interface can be an USB Type-C interface such that VCONN power supply 110 can be provided at DFP side with one or more CC pins coupled to the USB Type-C cable at DFP and UFP sides respectively.

In an exemplary embodiment, the predetermined voltage to be at the CC pin (V-ref-CC-low), predetermined voltage to be at the VCONN (4 times of VCONN-OVP-Vref) and any other predetermined or threshold values can be stored in the database 124 that can be operatively coupled to the control unit 106.

In an exemplary embodiment, the pre-amplifier 120 is implemented to amplify voltage difference between source terminal voltages of sense switch (sense switch) 108-1 and VCONN switch 108-2. Then, the amplified differential signal can be provided to the over current detection comparator. Once the current through VCONN switch 108-2 increases more than the set current limit, the over current detection comparator can generate the first fault signal (ocp_fault) signal (or over current protection (OCP) fault signal) and it will turn off the charge pump 114. This makes the system 100 robust.

In an exemplary embodiment, the system 100 can implement resistor divider circuits (such as divide/4 circuits etc.) to scale down the voltage levels of various comparators' inputs in order to protect above-mentioned comparators from the excess voltage at input side.

It would be appreciated that although the proposed system 100 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system 100 can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system 100 is configured are well within the scope of the present invention.

Figure 2:
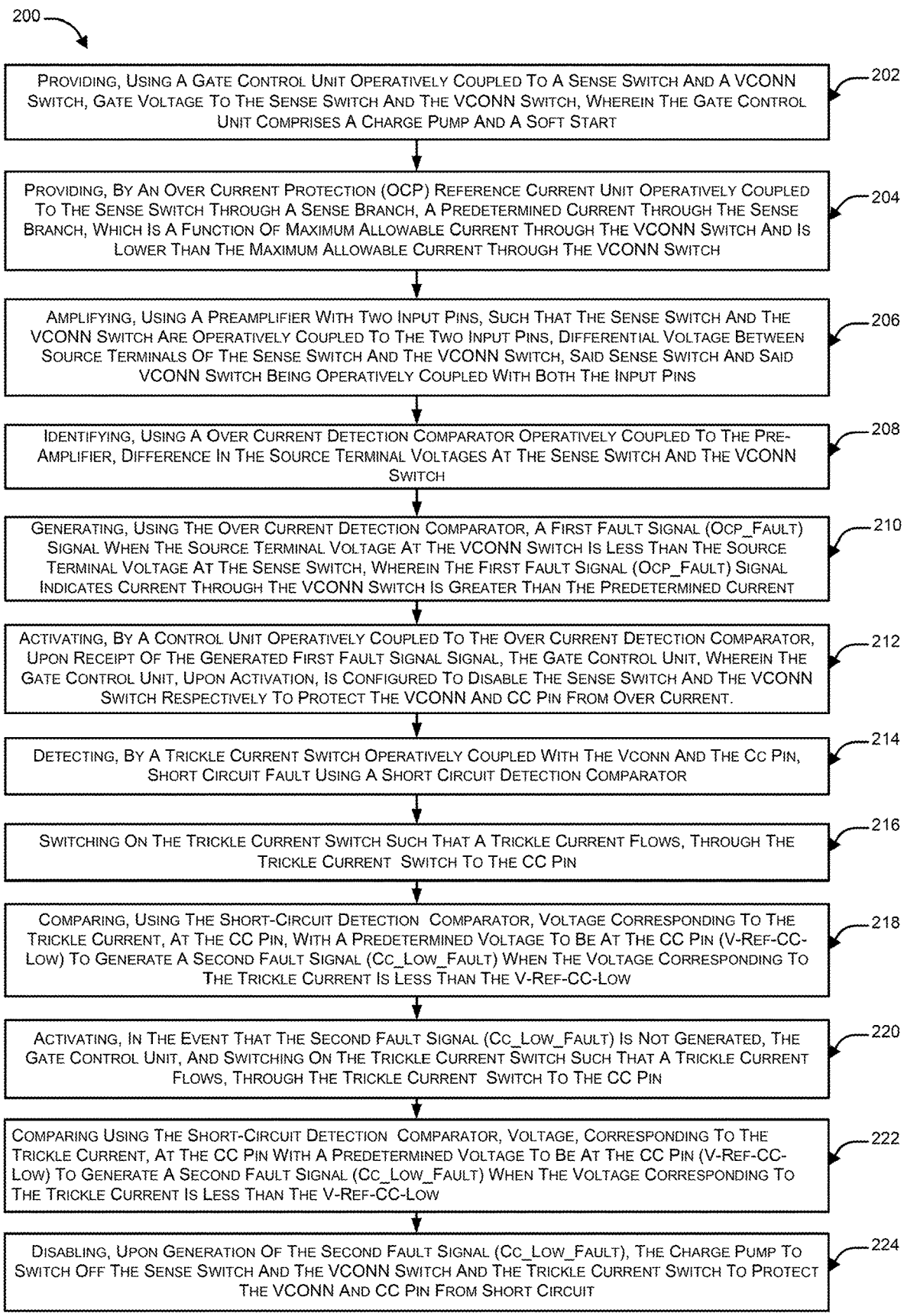
FIG. 2 illustrates an exemplary flow diagram representation of a method for providing VCONN (connection power) to at least one configuration channel (CC) pin in a universal serial bus (USB) interface, in accordance with an embodiment of the present disclosure.

FIG. 2 illustrates an exemplary flow diagram representation of a method for providing VCONN (connection power) to at least one configuration channel (CC) pin in a universal serial bus (USB) interface, in accordance with an embodiment of the present disclosure.

In an embodiment, the method 200 can include:

- 202—providing, using a gate control unit operatively coupled to a sense switch and a VCONN switch, gate voltage to the sense switch and the VCONN switch, wherein the gate control unit comprises a charge pump and a soft start;
- 204—providing, by an over current protection (OCP) reference current unit operatively coupled to the sense switch through a sense branch, a predetermined current through the sense branch, which is a function of maximum allowable current through the VCONN switch and is lower than the maximum allowable current through the VCONN switch;
- 206—amplifying, using a preamplifier with two input pins such that the sense switch and the VCONN switch are operatively coupled to the two input pins, a differential voltage between source terminals of the sense switch and the VCONN switch, said sense switch and said VCONN switch being operatively coupled with both the input pins;
- 208—identifying, using an over current detection comparator operatively coupled to the pre-amplifier, difference in the source terminal voltages at the sense switch and the VCONN switch;
- 210—generating, using the over current detection comparator, a first fault signal (ocp_fault) signal when the source terminal voltage at the VCONN switch is less than the source terminal voltage at the sense switch, wherein the first fault signal (ocp_fault) signal indicates current through the VCONN switch is greater than the predetermined current; and
- 212—activating, by a control unit operatively coupled to the over current detection comparator, upon receipt of the generated first fault signal (ocp_fault) signal, the gate control unit, wherein the gate control unit, upon activation, is configured to disable the sense switch and the VCONN switch respectively to protect the VCONN and CC pin from over current.

In another embodiment, the method 200 further includes,
- 214—detecting, by a trickle current switch operatively coupled with the VCONN and the CC pin, short circuit fault using a short circuit detection comparator;
- 216—switching on, before activating the gate control unit, the trickle current switch such that a trickle current flows, through the trickle current switch to the CC pin;
- 218—comparing, using the short-circuit detection comparator, voltage corresponding to the trickle current, at the CC pin, with a predetermined voltage to be at the CC pin (V-ref-CC-low) to generate a second fault signal (cc_low_fault) when the voltage corresponding to the trickle current is less than the V-ref-CC-low.

In another embodiment, the method 200 further includes,
- 220—activating, in the event that the second fault signal (cc_low_fault) is not generated, the gate control unit, and switching on the trickle current switch such that a trickle current flows, through the trickle current switch to the CC pin;
- 222—comparing using the short-circuit detection comparator, voltage, corresponding to the trickle current, at the CC pin with a predetermined voltage to be at the CC pin (V-ref-CC-low) to generate a second fault signal (cc_low_fault) when the voltage corresponding to the trickle current is less than the V-ref-CC-low; and
- 224—disabling, upon generation of the second fault signal (cc_low_fault), the CC protection switch as well as the charge pump to switch off the sense switch and the VCONN switch and the trickle current switch to protect the VCONN and CC pin from short circuit.

Figure 3:
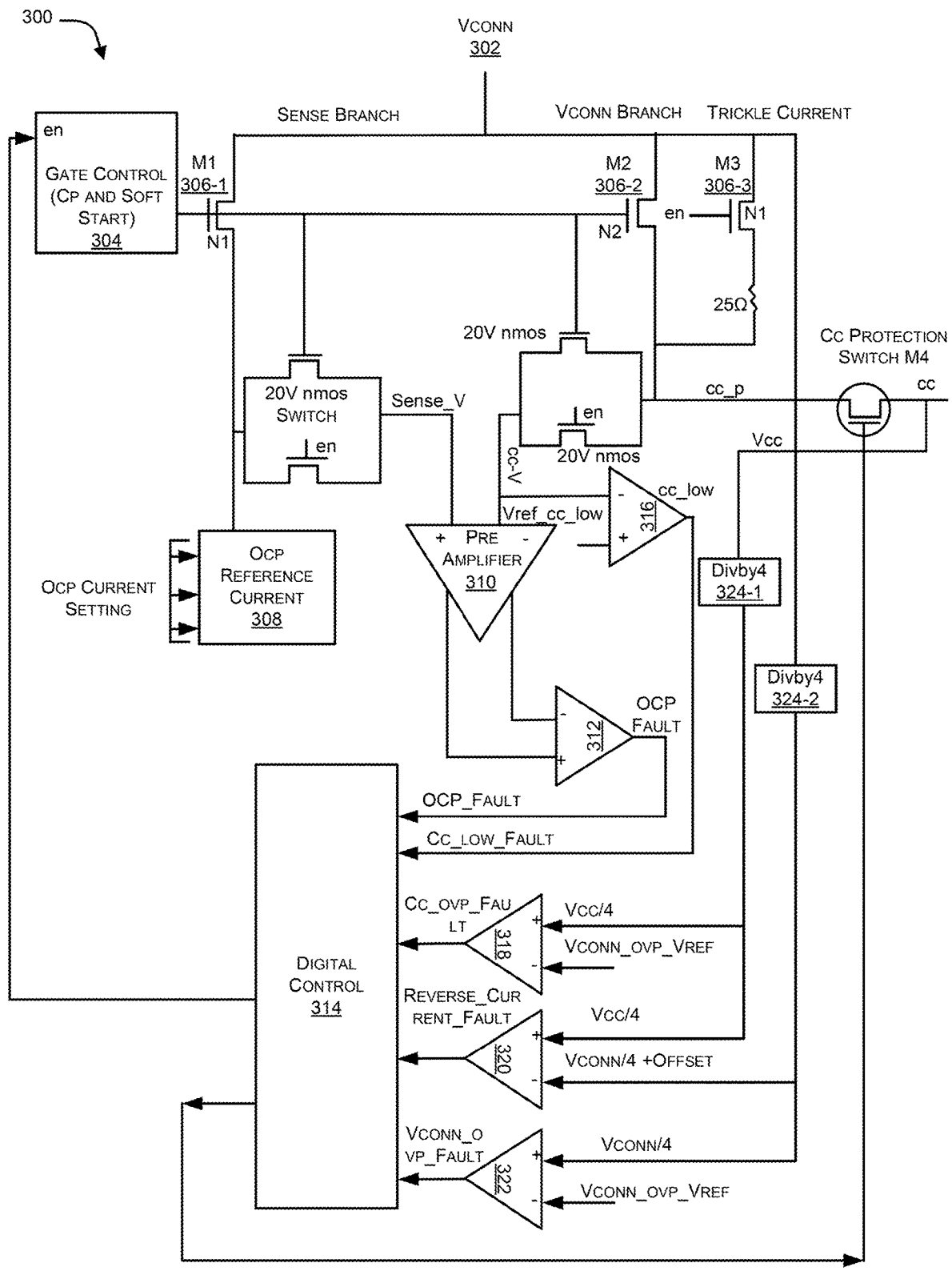
FIG. 3 illustrates an exemplary circuit diagram of the system of FIG. 1, in accordance with an embodiment of the present disclosure.

FIG. 3 illustrates an exemplary circuit diagram of the system of FIG. 1, in accordance with an embodiment of the present disclosure.

As shown in FIG. 3, the system 300 for providing power supply from VCONN to CC pin with enhanced protection can include VCONN supply 302, and a plurality of switches such that sense switch (M1 NMOS with sizing N1) 306-1, VCONN switch (M2 NMOS with sizing N2) 306-2, trickle current switch (M3 NMOS with sizing N1) 306-3 such that one end (drain side) of sense switch 306-1, VCONN switch 306-2 and trickle current switch 306-3 can be operatively coupled to VCONN supply 302 respectively. An over current protection (OCP) reference current unit 308 can be operatively coupled to the sense switch 306-1 and to a pre-amplifier 310 in order to set reference or threshold voltage (corresponding to the over current limit) at positive pin of the pre-amplifier 310. Negative pin of the pre-amplifier 310 can be operatively coupled to the VCONN switch 306-2 such that amplified difference between source terminal voltages (sense_v and CC_v) can be provided to over current detection comparator 312. The over current detection comparator 312 is configured to generate OCP fault signal when CC_v<sense_v in order to indicate over current limitation.

In an embodiment, the system 300 can include a short circuit detection comparator 316 that can be configured to receive input voltage from CC pin at negative terminal and Vref-cc-low at positive terminal. The short circuit detection comparator 316 can be configured to generate cc-low fault signal when voltage at CC pin is less than the Vref-cc-low to indicate short circuit condition.

In an embodiment, the voltage at CC_p (Vcc) and VCONN supply 302 can be scaled down as Vcc/4 and VCONN/4 by using resistor divider units such as divdeby4 324-1 and divideby4 324-2 respectively. Vcc/4 can be provided to CC over voltage detection comparator 318 at positive pin and reverse current detection comparator 320 at positive pin. VCONN/4 can be provided to reverse current detection comparator 320 at negative pin and to VCONN over voltage detection comparator 322 at positive pin. A predetermined low voltage at CC pin (Vref-cc-low) can be provided to short circuit detection comparator 316. A predetermined low voltage (VCONN-ovp-Vref) from VCONN 302 can be provided to CC over voltage detection comparator 318 at negative pin and to VCONN over voltage detection comparator 322 at negative pin.

The short circuit detection comparator 316 can be configured to generate CC low fault (or short circuit) signal when Vcc is less than Vref-cc-low. The CC over voltage detection comparator 318 can be configured to generate CC-OVP-fault signal when Vcc/4 is greater than VCONN-ovp-vref. The reverse current detection comparator 320 can be configured to generate reverse-current-fault signal when Vcc/4 is greater than VCONN/4. The VCONN over voltage detection comparator 322 can be configured to generate VCONN-ovp-fault signal when VCONN/4 is greater than the VCONN-ovp-vref. All the generated faults can be fed to digital control 314.

Upon generation of any fault mentioned-above, digital control 314 can be configured to activate enable pin of gate control 304. The gate control 304 can include charge pump and soft start. Upon activating the gate control 304, the charge pump disables sense switch 306-1, VCONN switch 306-2 and/or trickle current switch 306-3 in order to protect the system 300.

Figure 4A:
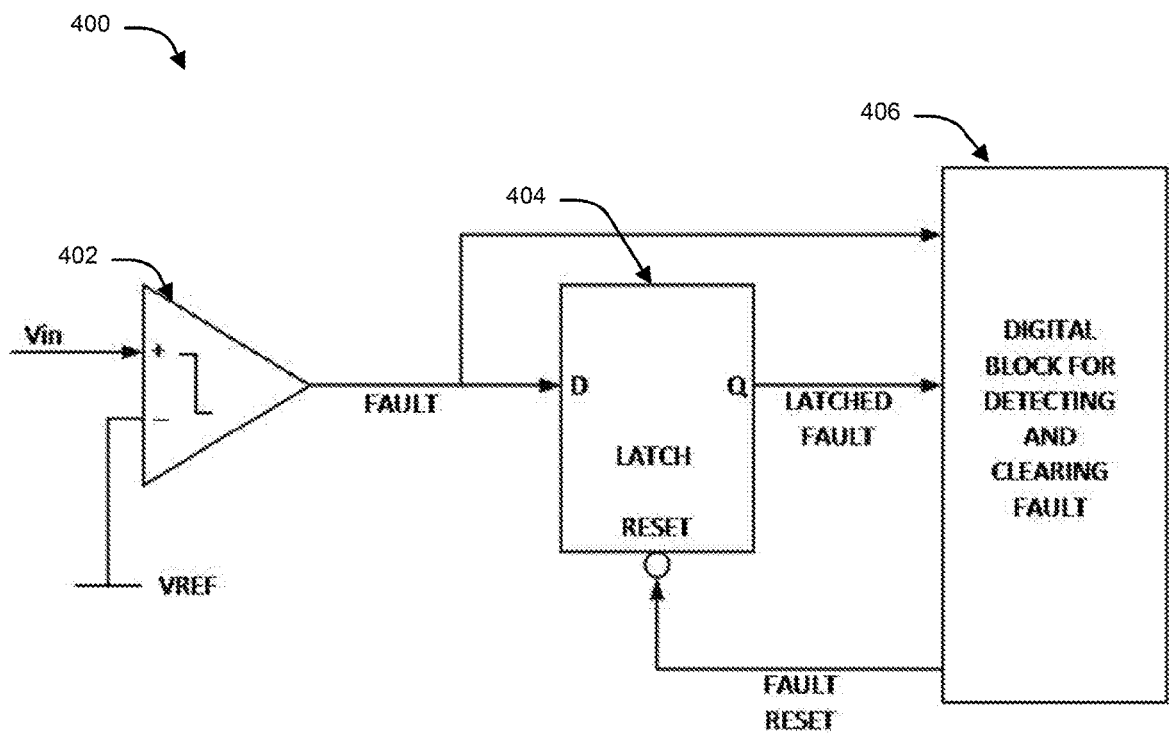
FIG. 4A illustrates an exemplary representation of a control unit of FIG. 1, in accordance with an embodiment of the present disclosure.

FIG. 4A illustrates an exemplary representation of a control unit of FIG. 1 for detecting and clearing faults, in accordance with an embodiment of the present disclosure. As shown in FIG. 4, the control unit can be a digital control unit 400. The fault generated from comparator 402 selected from any of the above-mentioned comparators can be provided to D-latch 404 to store the fault output. The latched output can be provided to digital block for detecting and clearing fault 406. The digital block for detecting and clearing fault 406 can be configured to reset the D latch 404 after enabling gate control unit (to switch off VCONN, CC pin and any other components) in order to protect the system from various voltage and current limitations.

Figure 4B:
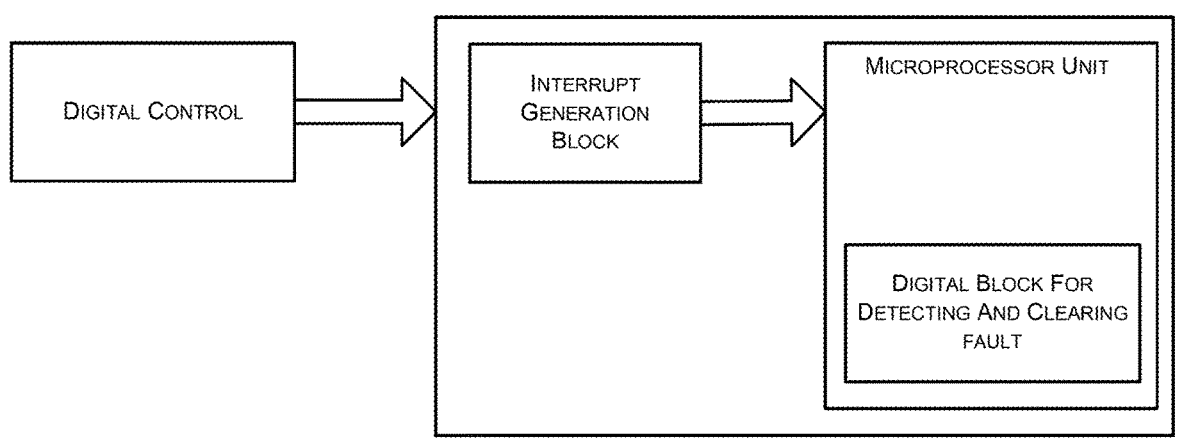
FIGS. 4B and 4C illustrate exemplary architectures of connection between the digital block and control unit, in accordance with an embodiment of the present disclosure.
Figure 4C:
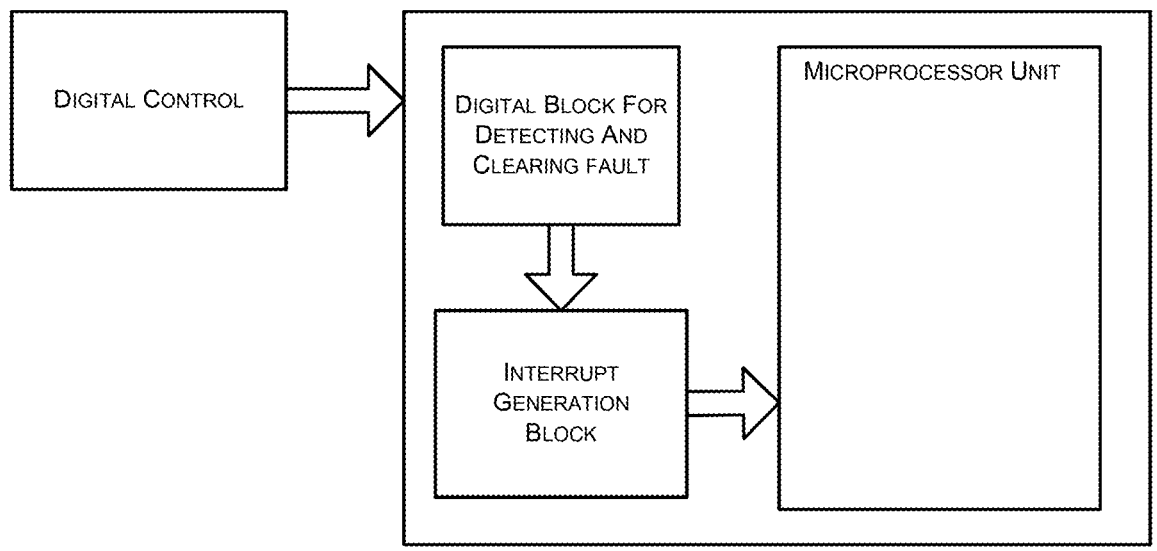

FIGS. 4B and 4C illustrate exemplary architectures of connection between the digital block and control unit, in accordance with an embodiment of the present disclosure. Referring to FIG. 4B, the digital block for detecting and clearing fault can be implemented as a firmware inside the control unit (such as micro-controller unit or any other controller). An interrupt generation block can be triggered by digital control, for example, interrupt generation block can be triggered upon generation of faults. Then, the control unit is configured to detect and clear faults upon generation of interrupts from interrupt generation block.

Referring to FIG. 4C, the digital block for detecting and clearing faults can be implemented using various logic gates, flip-flops, latches and/or any other combinational or sequential circuits. Upon generation of fault signals, digital control can activate the digital block for detecting and clearing faults. Then, the digital block triggers interrupt generation block to generate corresponding interrupt signals to microcontroller unit. This way of implementation of the digital block, using gates and flip flops outside the control unit, can improve time-efficiency in detecting and clearing faults of firmware.

Figure 4D:
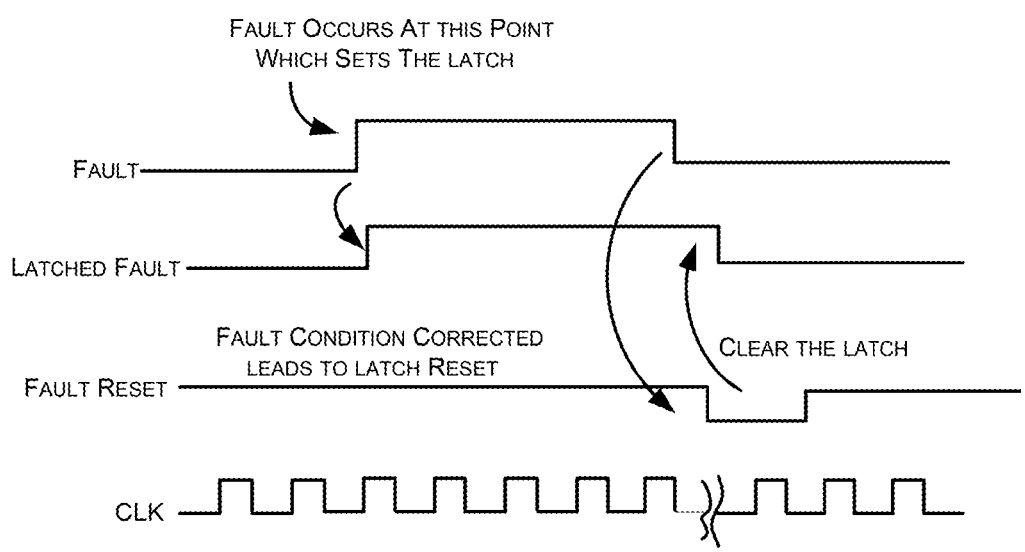
FIG. 4D illustrates an exemplary representation of fault clearing sequence, in accordance with an embodiment of the present disclosure.

FIG. 4D illustrates an exemplary representation of fault clearing sequence, in accordance with an embodiment of the present disclosure. In an embodiment, the fault clearing sequence can include the steps,
  setting of the latch on occurrence of the fault;
  monitoring of the fault by digital portion, where the digital portion disables VCONN, leading to correction of fault and, thereby, fault de-assertion; and
  clearing of the latch on fault de-assertion to enable VCONN.

In another embodiment, the comparators 312, 316 begin simultaneously. When the short circuit detection comparator 316 detects a fault, it breaks, else the functioning of both comparators 312, 316 continue.

Figure 4E:
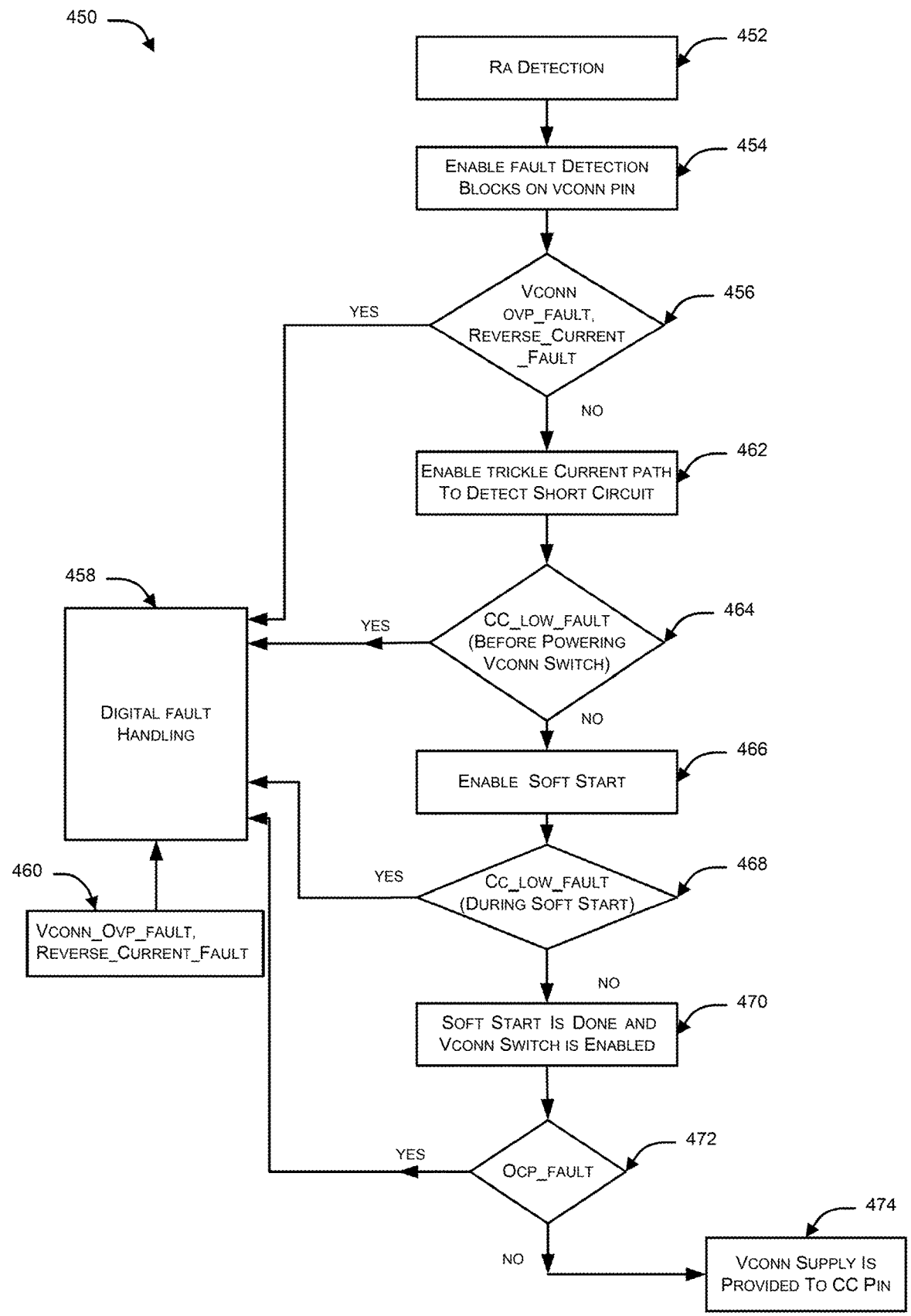
FIG. 4E illustrates an exemplary flow diagram for fault detection and handling, in accordance with an embodiment of the present disclosure.

FIG. 4E illustrates an exemplary flow diagram for a method for fault detection and handling, in accordance with an embodiment of the present disclosure. In an embodiment, the method 450 includes the steps of:
  452—enabling RA detection;
  454—enabling fault detection blocks on VCONN pin;
  456—checking if there is a reverse current fault or VCONN over voltage fault;
  458—if yes, proceed to activate the digital fault clearing circuit;
  460—monitoring status of fault condition during fault clearing procedure;
  462—if there is no reverse current fault or VCONN over voltage fault, enable trickle current path to detect short circuit;
  464—checking if there is a CC_low fault; if yes, proceed to steps 460 and 462;
  466—if there is no CC_low fault, enable soft start;
  468—checking if there is a CC_low fault during soft start; if yes, proceed to steps 460 and 462;
  470—if there is no CC_low fault, enable VCONN switch;
  472—checking if there is OCP fault; if yes, proceed to steps 460 and 462;
  474—if there is no OCP fault, VCONN supply to CC pin.

Figure 5:
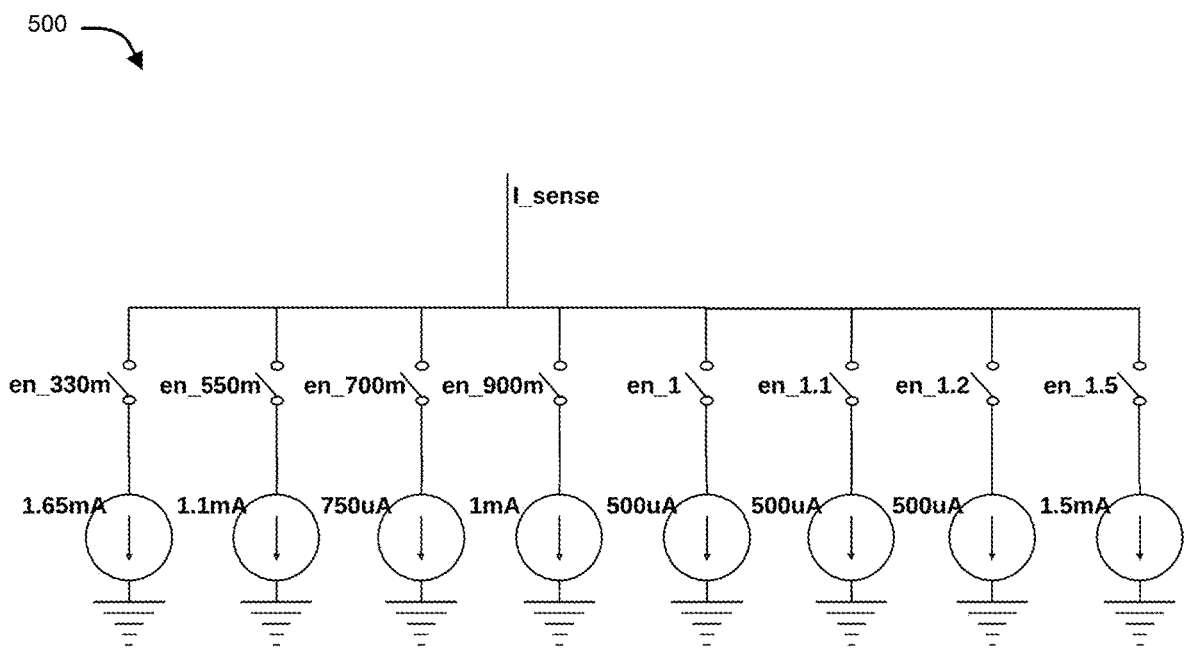
FIG. 5 illustrates an exemplary circuit representation for providing/setting various OCP reference currents as threshold, in accordance with an embodiment of the present disclosure.

FIG. 5 illustrates an exemplary circuit representation for providing/setting various OCP reference currents as threshold, in accordance with an embodiment of the present disclosure. The circuit 500 can be configured to select any of plurality of switches in order to provide corresponding current as limiting current to OCP current settings unit. Table 1 is provided below to show combination of bits used to select different values of over current limits. Here N1/N2 is used as 1/200. It is to be appreciated that the values (as shown in FIG. 5 and as listed in Table 1) are for the purposes of illustration and may not be construed as limitations to the application and scope of the present disclosure.

TABLE 1

| en_330m | en_550m | en_700m | en_900m | en_1 | en_1.1 | en_1p2 | en_1p5 | I_sense | Set over current value |
|---|---|---|---|---|---|---|---|---|---|
| 1 | 0 | 0 | 0 | 0 | 0 | 0 | 0 | 1.65 mA | 330 mA |
| 1 | 1 | 0 | 0 | 0 | 0 | 0 | 0 | 2.75 mA | 550 mA |
| 1 | 1 | 1 | 0 | 0 | 0 | 0 | 0 | 3.5 mA | 700 mA |
| 1 | 1 | 1 | 1 | 0 | 0 | 0 | 0 | 4.5 mA | 900 mA |
| 1 | 1 | 1 | 1 | 1 | 0 | 0 | 0 | 5 mA | 1 A |
| 1 | 1 | 1 | 1 | 1 | 1 | 0 | 0 | 5.5 mA | 1.1 A |
| 1 | 1 | 1 | 1 | 1 | 1 | 1 | 0 | 6 mA | 1.2 A |
| 1 | 1 | 1 | 1 | 1 | 1 | 1 | 1 | 7.5 mA | 1.5 A |

In an exemplary embodiment, apart from over current limit selection bits, a provision can be provided to trim the selected current further, using below trim bits. For this Table 2 is shown below for 330 mA as load current with trimming. It is to be appreciated that the values (as listed in Table 1) are for the purposes of illustration and may not be construed as limitations to the application and scope of the present disclosure.

TABLE 2

| trim 0 | trim 1 | trim 2 | I_sense (mA) | I_load (mA) |
|---|---|---|---|---|
| 0 | 0 | 0 | 1.69 | 343.2 |
| 0 | 0 | 1 | 1.281 | 260.1 |
| 0 | 1 | 0 | 1.895 | 384.8 |
| 0 | 1 | 1 | 1.485 | 301.6 |
| 1 | 0 | 0 | 1.792 | 364 |
| 1 | 0 | 1 | 1.383 | 280.9 |
| 1 | 1 | 0 | 1.997 | 405.5 |
| 1 | 1 | 1 | 1.588 | 322.4 |

In order to increase reference current, there is a need to increase size of transistor. One way of increasing current can involve the use of individual MOSFETS and additional current sources, but this may increase additional area as well. Another way of increasing current can involve adding existing current sources collectively to make increase in reference current, instead of implementing additional current sources.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present invention provides a system and method for providing VCONN (connection power) to at least one configuration channel (CC) pin in a universal serial bus (USB) interface.

The present invention provides a robust system and method for providing VCONN (connection power) to configuration channel (CC) pin in a USB interface.

The present invention provides a simple and effective system and method for providing VCONN (connection power) to configuration channel (CC) pin in a USB interface.

The present invention provides a reliable and efficient system and method for providing VCONN (connection power) to configuration channel (CC) pin in a USB interface with enhanced protection from over current, short circuit, over voltage and reverse current limitations at CC pin and VCONN pin.

What is claimed is:

1. A system for providing VCONN (connection power) to any one configuration channel (CC) pin in a universal serial bus (USB) interface with protections on both VCONN and configuration channel independently, the system comprising:
   a sense switch of a first predefined size operatively coupled with a VCONN supply and through a sense branch;
   a VCONN switch of a second predefined size operatively coupled with the VCONN supply and the CC pin through a VCONN branch such that current through the VCONN switch remains within a predefined current limit;
   a gate control unit operatively coupled with the sense switch and the VCONN switch and comprising a charge pump and a soft start, wherein the gate control unit is configured to provide a gate voltage to the sense switch and the VCONN switch, said gate voltage being of a same value at both of the sense switch and the VCONN switch;
   an over current protection (OCP) reference current unit operatively coupled with the sense switch through the sense branch, wherein the OCP reference current unit is configured to provide a predetermined current through the sense branch, which is a function of maximum allowable current through the VCONN switch and is lower than the maximum allowable current through the VCONN switch;
   a preamplifier with two input pins such that the sense switch and the VCONN switch are both operatively coupled with both the input pins, wherein the preamplifier is configured to amplify a differential voltage between source terminals of the sense switch and the VCONN switch;
   an Over Current detection comparator operatively coupled to the pre-amplifier, the Over Current detection comparator configured to identify a difference in the source terminal voltages at the sense switch and the VCONN switch, and generate an Over Current fault signal when the source terminal voltage at the VCONN switch is lower than the source terminal voltage at the sense switch, wherein the Over Current fault signal indicates current through the VCONN switch is greater than the predetermined current; and
   a control unit operatively coupled to the Over Current comparator and the gate control unit, the control unit comprising one or more processors and a memory, the memory storing instructions executable by the one or more processors to:
      activate, upon receipt of the generated Over Current fault signal, the gate control unit, wherein the gate control unit, upon activation, is configured to disable the sense switch and the VCONN switch respectively to protect the VCONN and CC pin from over current.

2. The system as claimed in claim 1, wherein the preamplifier is a rail-to-rail fully differential cascode amplifier.

3. The system as claimed in claim 1, wherein the first branch is a sense branch and the second branch is a VCONN branch.

4. The system as claimed in claim 3, wherein the sense switch is an N-type metal-oxide-semiconductor (NMOS) of size N1 and the VCONN switch is an NMOS of size N2, and wherein N1<N2 with N1 and N2 being any value above 1.

5. The system as claimed in claim 3, wherein the sense switch is a P-type metal-oxide-semiconductor (PMOS) of size N1 and the VCONN switch is a PMOS of size N2, and wherein N1<N2 with N1 and N2 being any value above 1.

6. The system as claimed in claim 3, wherein the system comprises a programmable sense current source operatively coupled to the control unit and the Over Current reference current unit, wherein the control unit is configured to control the programmable sense current source to modify current through the sense branch to modify corresponding source terminal voltage at the sense switch to modify over current limit.

7. The system as claimed in claim 1, wherein the control unit is configured to, upon activation of the fault, disable the charge pump to switch off the sense switch, the VCONN switch and trickle current switch.

8. The system as claimed in claim 1, wherein the system comprises:
   a trickle current switch operatively coupled to the VCONN and the CC pin to detect short-circuit fault by using a short-circuit detection comparator, wherein, before activating the gate control unit, the control unit is configured to:
      switch on the trickle current switch such that a trickle current flows, through the trickle current switch to the CC pin; and
      compare, using the short-circuit detection comparator, voltage corresponding to the trickle current at the CC pin, with a predetermined voltage to be at the CC pin, wherein a second fault signal is generated when the voltage corresponding to the trickle current is less than the predetermined voltage to be at the CC pin.

9. The system as claimed in claim 8, wherein, for the fault signal not being generated, the control unit is configured to activate the gate control unit, and configured to:
   switch on the trickle current switch such that a trickle current flows through the trickle current switch to the CC pin;
   compare, using the short-circuit detection comparator, the voltage corresponding to the trickle current at the CC pin, with the predetermined voltage to be at the CC pin (V-ref-CC-low), wherein the second fault signal is generated when the voltage corresponding to the trickle current is less than the predetermined voltage to be at the CC pin; and
   disable, upon generation of the fault signal, the charge pump to switch off the sense switch, the VCONN switch, and the trickle current switch to protect the VCONN and the CC pin from short circuit.

10. The system as claimed in claim 8, wherein the control unit is configured to determine a CC short circuit fault when the voltage at the CC pin is below the predetermined voltage to be at the CC pin, after which the trickle current switch is disabled by a digital block, and wherein the digital block enables the trickle current switch after a pre-defined time window.

11. The system as claimed in claim 8, wherein, after VCONN is enabled, the short-circuit detection fault comparator is disabled, and wherein one or more short-circuit or over-current conditions on a CC/VCONN line are determined by the over-current comparator.

12. The system as claimed in claim 1, wherein the system comprises a CC Over-Voltage detection comparator, the CC Over Voltage detection comparator is configured to compare voltage at the CC pin with a predetermined voltage to be at the CC to generate a CC Over Voltage fault signal when the voltage at the CC pin is greater than the predetermined voltage to be at the CC, wherein the control unit is configured to disable, upon generation of the CC Over Voltage fault signal, a CC protection switch as well as the charge pump to disconnect the VCONN supply and to protect the VCONN and CC pin from over voltage at the CC pin.

13. The system as claimed in claim 1, wherein the system comprises a reverse current detection comparator configured to compare voltage at the CC pin with voltage at a VCONN pin, and generate a reverse current fault signal when the voltage at the CC pin voltage is greater than the voltage at the VCONN pin, and wherein the control unit is configured to disable, upon generation of the reverse current fault signal, the charge pump and a CC protection switch to disconnect the VCONN supply and to protect the VCONN and CC pin from reverse current flowing from the CC pin to the VCONN pin.

14. The system as claim 1, wherein the system comprises a VCONN over voltage detection comparator configured to compare voltage at a VCONN line with a predetermined voltage to be at the VCONN to generate a VCONN over voltage fault signal, and wherein the control unit is configured to disable, upon generation of the VCONN over voltage fault signal, the charge pump to disconnect the VCONN supply and to protect the VCONN and the CC pin from over voltage at a VCONN pin.

15. The system as claimed in claim 1, wherein the system comprises a fault clearing digital circuit operatively coupled to the control unit, and wherein the control unit is configured to:
 reset, using the fault clearing digital circuit, a fault signal to be cleared that can be selected from one or more of the Over Current fault signal, a short-circuit fault signal, a CC Over voltage fault signal, a reverse current fault signal, or a VCONN Over voltage fault signal; and
 enable the VCONN supply once the fault signal to be cleared is reset.

16. The system as claimed in claim 15, wherein the fault clearing digital circuit, upon receiving a generated fault signal pertaining to the CC Over voltage fault signal, is configured to:
 when an interrupt is raised to the fault clearing digital circuit, disable a CC protection switch, and wherein, when a fault condition associated with the generated fault signal abates as detected by a CC over-voltage comparator, the CC protection switch is enabled.

17. The system as claimed in claim 15, wherein the fault clearing digital circuit, upon receiving a generated fault signal pertaining to the reverse current fault signal, is configured to:
 when an interrupt is raised to the fault clearing digital circuit, disable the VCONN switch, a CC protection switch and a trickle current switch, and wherein, when a fault condition associated with the generated fault signal abates as detected by a reverse current comparator, the VCONN switch, the CC protection switch and the trickle current switch are enabled.

18. The system as claimed in claim 15, wherein the fault clearing digital circuit, upon receiving a generated fault signal pertaining to an over-current fault on the CC pin, is configured to:
 when an interrupt is raised to the fault clearing digital circuit, disable the VCONN supply for a pre-defined period of time;
 wherein the VCONN supply is enabled after the pre-defined period of time, and wherein, in the presence of a fault condition associated with the generated fault signal, the VCONN supply remains disabled, and wherein when the fault condition associated with the generated fault signal abates, the VCONN supply is enabled.

19. A method for providing VCONN (connection power) to any one configuration channel (CC) pin in a universal serial bus (USB) interface with protections on both VCONN and configuration channel independently, the method comprising the steps of:
 providing, using a gate control unit operatively coupled to a sense switch and a VCONN switch, gate voltage to the sense switch and the VCONN switch, wherein the gate control unit comprises a charge pump and a soft start;
 providing, by an over current protection (OCP) reference current unit operatively coupled to the sense switch through a sense branch, a predetermined current through the sense branch, which is a function of maximum allowable current through the VCONN switch and is lower than the maximum allowable current through the VCONN switch;
 amplifying, using a preamplifier with two input pins, such that the sense switch and the VCONN switch are operatively coupled to the two input pins, a differential voltage between source terminals of the sense switch and the VCONN switch, said sense switch and said VCONN switch being operatively coupled with both the input pins;
 identifying, using an over current detection comparator operatively coupled to the pre-amplifier, difference in the source terminal voltages at the sense switch and the VCONN switch;
 generating, using the over current detection comparator, a first fault signal (ocp_fault) signal when the source terminal voltage at the VCONN switch is less than the source terminal voltage at the sense switch, wherein the first fault signal (ocp_fault) signal indicates current through the VCONN switch is greater than the predetermined current; and
 activating, by a control unit operatively coupled to the over current detection comparator, upon receipt of the generated first fault signal (ocp_fault) signal, the gate control unit, wherein the gate control unit, upon activation, is configured to disable the sense switch and the VCONN switch respectively to protect the VCONN and CC pin from over current.

* * * * *